United States Patent [19]

Murachi

[11] Patent Number: 4,668,565
[45] Date of Patent: May 26, 1987

[54] STRUCTURE FOR MOUNTING MOLDING

[75] Inventor: Tatsuya Murachi, Aichi, Japan

[73] Assignee: Toyoda Gosei Co., Ltd., Nishikasugai, Japan

[21] Appl. No.: 835,884

[22] Filed: Mar. 3, 1986

[30] Foreign Application Priority Data

Mar. 5, 1985 [JP] Japan .................................. 60-43420

[51] Int. Cl.⁴ .......................... B32B 7/00; B60R 19/02
[52] U.S. Cl. ..................................... 428/261; 428/262;
428/290; 428/297; 428/353; 428/354; 428/355;
428/319.7; 428/424.8; 428/424.4; 428/463;
428/157; 428/31; 428/518; 428/506; 428/514;
293/1; 293/102
[58] Field of Search ................. 428/353, 31, 354, 355,
428/297, 319.7, 290, 260, 261, 297, 424.8, 463,
424.4, 516, 520, 518, 506, 514; 427/208

[56] References Cited

U.S. PATENT DOCUMENTS

| 3,577,626 | 5/1971 | Link .................................... 428/31 X |
| 3,628,987 | 12/1971 | Nakata et al. ......................... 428/353 |
| 3,687,502 | 8/1972 | Loew ........................................ 293/1 |
| 3,745,056 | 7/1973 | Jackson ................................ 428/157 |
| 4,061,805 | 12/1977 | Thompson et al. .................... 428/31 |

Primary Examiner—P. C. Ives
Attorney, Agent, or Firm—Cushman, Darby & Cusyman

[57] ABSTRACT

A structure for a synthetic resin-made molding for a bodies, bumpers, etc. of automobiles is adhered via a double-coated adhesive tape. Adhesives comprising chloroprene rubbers, isobutylene-isoprene rubbers and phenolic resins and primers comprising a mixture of at least one polymer selected from polyacrylic acid derivatives and polymethacrylic acid derivatives and chloroprene rubbers are coated and formed between the molding and the tape.

2 Claims, 2 Drawing Figures

STRUCTURE FOR MOUNTING MOLDING

BACKGROUND OF THE INVENTION

1. Field of the Invention

The present invention relates to a structure for mounting molding in a body side or in a bumper of an automobile.

2. Description of the Related Art

Moldings are mounted in bodies or bumpers of automobiles for purposes of both decoration and protection.

As the related art of the present invention, a molding composed of a synthetic resin such as polyvinyl chloride, etc. and a structure for mounting as described below with reference to FIG. 2 is known.

Namely, as shown in FIG. 2, tape 32 coated on both of its faces with adhesive 34 so as to constitute a double-coated adhesive tape is inserted between a molding 30 comprising polyvinyl chloride and a body 31 and via this adhesive double-coated tape 32, this molding 30 is mounted to body 31.

This adhesive double-coated tape 32 is obtained by coating both surfaces of foam 33 composed of acrylic rubber formed in a thin plate with adhesive 34 of acrylic or chloroprene rubber. In the thus-constructed structure for mounting molding as described above, molding 30 is sometimes peeled apart at the interface with adhesive 34 due to the following reasons:

(1) The molding contracts or expands because of a temperature difference between day and night or between a winter season and a summer season.

(2) The molding 30 contracts because low molecular compounds in molding 30 blooms, scatters into the air or bleeds, whereby molding 30 contracts to cause stripping between the molding 30 and adhesive 34.

(3) Due to interaction with heat, light or moisture, etc., stabilizers or plasticizers in molding 30 are decomposed to form low molecular compounds and these compounds are scattered into the air to cause contraction of molding 30 and cause peeling between molding 30 and adhesive 34.

SUMMARY OF THE INVENTION

An object of the present invention is to provide a structure for mounting molding capable of improving adhesion of the molding to a material to be adhered, to such as a body, a bumper, etc. of automobiles and preventing the molding from being peeled apart from the material.

For purposes of achieving the aforesaid object, the structure for mounting molding of the present invention comprises a material to be adhered, a resin-made molding adhered to the aforesaid material via a double-coated tape, a primer coated on the back surface of the aforesaid molding, which primer comprises a mixture of at least one polymer selected from a polyacrylic acid derivative and a polymethacrylic acid derivative and a chloroprene rubber, and an adhesive comprising a mixture of a chloroprene rubber, an isobutylene-isoprene rubber and a phenolic resin.

Other objects of the present invention will be apparent from the embodiments described below and from the appended claims. Many advantages that are not mentioned in the present specification will be obvious to one skilled in the art upon the practice of the present invention.

DETAILED DESCRIPTION OF THE PREFERRED EMBODIMENTS

Figure 1:
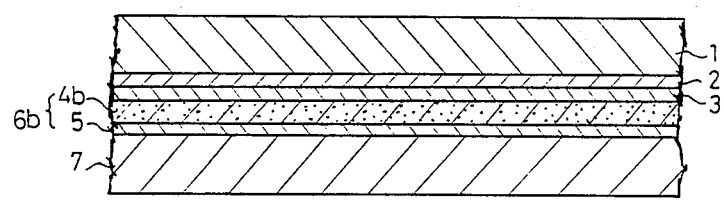
FIG. 1 is a fragmentary cross sectional view showing an example embodying the present invention in a structure for mounting a molding for side protection of an automobile.
Figure 2:
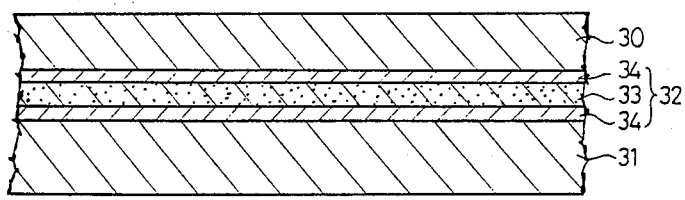
FIG. 2 is a fragmentary cross sectional view showing a structure for mounting molding as the related art of the present invention.

Firstly, respective components constituting the adhesive used in the present invention, namely, chloroprene rubbers, isobutylene-isoprene rubbers and phenolic resins, are explained below.

Chloroprene rubbers (hereinafter simply referred to as CR) are polymers obtained by polymerizing chloroprene and have been widely used as adhesives for metals, rubbers or synthetic resins, etc. In the present invention, unvulcanized chloroprene rubbers are used.

Isobutylene-isoprene rubbers (hereinafter simply referred to as IIR) which are also called butyl rubbers are copolymers obtained by polymerizing isobutylene and isoprene. Likewise CR described above, unvulcanized ones are used.

Next, phenolic resins are novolak-type adhesive polymers obtained by thermally condensing phenol and aldehydes (mainly formaldehyde) using acids as catalysts.

Further novolak-type phenolic resins comprising natural resins such as turpentine phenolic resins, rosin-modified phenolic resins, etc. can also be used.

To prepare the adhesive of the present invention, it is sufficient to simply mix the above-described CR, IIR and phenolic resins in organic solvents. Examples of the organic solvents used herein include a solvent appropriately chosen from saturated hydrocarbons such as n-hexane, cyclohexane, etc.; aromatic hydrocarbons such as benzene, toluene, xylene, etc.; ethers such as dioxane, tetrahydrofuran, etc.; acetates such as ethyl acetate, butyl acetate, propyl acetate, etc.; ketones such as acetone, cyclohexanone, methyl ethyl ketone, etc.; or a solvent mixture of two or more of these solvents.

It is preferred that the formulation ratios of CR, IIR and the phenolic resin be 5 to 10 parts by weight (solid content, hereafter the same) of IIR and 1 to 50 parts by weight of the phenolic resin (solid content, hereafter the same) based on 100 parts by weight of CR (solid content, hereafter the same), inter alia, 20 to 40 parts by weight of IIR is the optimum formulation ratic.

With less than 5 parts by weight of IIR, adhesion decreases and with more than 100 parts by weight, adhesion decreases at high temperatures.

Further, when the ratio of the phenolic resin is less than 1 part by weight, adhesion descreases; with more than 50 parts by weight, hardness of the adhesive becomes high so that coated layers tend to be brittle.

In this case, it is appropriate that the concentration of the solid in the organic solvent be 5 to 50%, preferably 20 to 40%; with more than 50%, there is a danger that the solid might precipitate out.

Further when the concentration of the solid is too low, a layer thickness becomes thin when coated on a tape so that less than 5% is not preferred.

If necessary, inorganic fillers such as carbon black, calcium carbonate, clay, sodium carbonate, etc. can be incorporated in the above-described adhesive; even in this case, there is no danger that adhesion might be reduced.

Next, respective components constituting the primer used in the present invention are explained below.

The primer most suited for the above-described adhesive is a composition obtained by mixing at least one polymer selected from polyacrylic acid derivatives and polymethacrylic acid derivatives and the above-described CR in the above-described organic solvents.

Examples of the above-described polyacrylic acid derivatives include polymers of methyl acrylate, ethyl acrylate, n-butyl acrylate, iso-butyl acrylate, 2-ethylhexyl acrylate, isodecyl acrylate, 2-hydroxyethyl acrylate, 2-hydroxypropyl acrylate, glycidyl acrylate and dimethylaminoethyl acrylate.

Examples of the polymethacrylic acid derivatives include polymers of methyl methacrylate, ethyl methacrylate, n-butyl methacrylate, iso-butyl methacrylate, 2-ethylhexyl methacrylate, isodecyl methacrylate, 2-hydroxyethyl methacrylate, 2-hydroxypropyl methacrylate, glycidyl methacrylate and dimethylaminoethyl methacrylate.

The above-described polyacrylic acid derivatives or polymethacrylic acid derivatives may be used singly or by appropriately mixing several kinds thereof, respectively.

Further these derivatives should be mixed in 10 to 500 parts by weight (solid content, hereafter the same) based on 100 parts of CR. With less than 10 parts by weight, the polarity of the primer composition decreases so that the adhesion decreases. On the other hand, with more than 500 parts by weight, the hardness of the primer composition becomes high so that coated layers tend to be brittle.

Further, the molding to which the present invention applies is a polyvinyl chloride resin and composed of the following composition shown in Table 1 described below as an example.

TABLE 1

| Vinyl chloride (polymerization degree, 1450) | 100 parts |
| Dioctyl phthalate | 80 parts |
| Epoxylated soybean oil | 3 parts |
| Zinc stearate | 4.5 parts |

(Parts in the table are all by weight, hereafter the same.)

In addition to polyvinyl chloride, synthetic resins such as polyurethane, ethylene-vinyl acetate copolymers, etc. and polyolefin vulcanized rubbers such as ethylene-propylenediene terpolymer rubbers (EPDM), ethylene-propylene copolymer rubbers (EPM), etc. can also be objects to be applicable.

To coat the adhesive or the primer onto these moldings, coating is carried out by techniques such as roll coating, dip coating, spray coating, etc. In the case of using a molding made of polyolefin vulcanized rubbers, it is desired that the surface of the molding be activated by subjecting the surface to pretreatments such as a corona discharge treatment, etc., in order to improve adhesion of the primer.

After the adhesive or the primer is coated onto the molding, it is necessary to dry it for about 30 minutes.

In case that a heat treatment is conducted to accelerate drying, the treatment should be conducted at temperatures lower than 100° C. in order to prevent deterioration of the adhesive or the primer.

In addition to foams of acrylic rubbers, polyethylene, etc. in a thin plate, unwoven cloth, craft paper, synthetic resin films, etc. can also be used as tapes.

In the case of using polyethylene-made tapes, it is desired that the surface of the tape be activated by subjecting the surface to a pretreatment such as a corona discharge treatment in order to improve adhesion of the adhesive.

Hereafter, an example embodying the present invention for a structure for mounting a polyvinyl chloride-made molding for side protector of an automobile will be described with reference to FIG. 1.

Primer 2 and adhesive 3 are inserted between the back surface of molding 1 and tape 4 comprising a polyethylene foam and, adhesive 5 between tape 4 and body 7. Molding 1 is mounted in body 7 via the primer 2, adhesive 3, tape 4 and adhesive 5.

Molding 1 described above is prepared by extrusion-molding the composition shown in Table 1 described above at 170° C. Body 7 is prepared by subjecting the surface of a steel plate to an acrylic baking finish.

Further, primer 2 described above is coated on the back surface of molding 1. On the other hand, commercially available adhesive single-coated tape 6 coated with acrylic adhesive 5 is used at one surface of tape 4. Adhesive 3 may be coated onto the non-adhesive surface of the adhesive single-coated tape 6 or onto the surface of primer 2.

In the present example, molding 1 was mounted in body 7 as follows. Firstly, primer 2 was coated on the back surface of molding 1 followed by air-drying at room temperature for 30 minutes. Then, adhesive 3 was coated on the surface of primer 2 followed by air-drying at room temperature for further 30 minutes. Next, the non-adhesive surface of adhesive single-coated tape 6 was adhered to the surface of adhesive 3. Thereafter, the adhesive surface of adhesive single-coated tape 6 was adhered to body 7 and the surface of molding 1 was pressed with the hand in the direction of body 7.

Primer 2 described above is a composition obtained by mixing at least one polymer selected from the aforesaid polyacrylic acid derivatives and polymethacrylic acid derivatives in the organic solvent. In this example, the compositions shown in Tables 2 through 4 described below were used.

These primers can be all prepared by simply mixing the respective components in the organic solvent.

TABLE 2

| (Primer A) | |
| --- | --- |
| CR | 100 parts |
| Polymethyl methacrylate | 10 parts |
| Toluene | 1800 parts |
| n-Hexane | 1800 parts |

TABLE 3

| (Primer B) | |
| --- | --- |
| CR | 100 parts |
| Poly-n-butyl methacrylate | 50 parts |
| Toluene | 2425 parts |
| n-Hexane | 2425 parts |

TABLE 4

| (Primer C) | |
| --- | --- |
| CR | 100 parts |
| Polymethyl methacrylate | 250 parts |
| Polyethyl methacrylate | 250 parts |

TABLE 4-continued

| (Primer C) | |
|---|---|
| Toluene | 9700 parts |
| n-Hexane | 9700 parts |

Next, adhesives shown in Tables 5 to 8 described below were used as adhesives 3. These adhesives can be prepared by simply mixing the respective components in the organic solvent.

TABLE 5

| (Adhesive A) | |
|---|---|
| CR | 100 parts |
| IIR | 5 parts |
| phenolic resin | 1 part |
| n-Hexane | 159 parts |
| Toluene | 159 parts |

The phenolic resin described above is a novolak-type phenolic resin "Tamanol-520S" manufactured by Arakawa Chemical Industry Co., Ltd.

TABLE 6

| (Adhesive B) | |
|---|---|
| CR | 100 parts |
| IIR | 30 parts |
| phenolic resin | 10 parts |
| Organic solvent | 420 parts |

The phenolic resin in Adhesive B is a novolak-type turpentine phenolic resin "Tamanol-803" manufactured by Arakawa Chemical Industry Co., Ltd. Further—the organic solvent is a solvent mixture of n-hexane/toluene=1/1.

TABLE 7

| (Adhesive C) | |
|---|---|
| CR | 100 parts |
| IIR | 100 parts |
| Phenolic resin | 50 parts |
| Organic solvent | 750 parts |

The phenolic resin in Adhesive C is a novolak-type rosin-modified phenolic resin "Tamanol-340" manufactured by Arakawa Chemical Industry Co., Ltd. Further—the organic solvent is a solvent mixture of n-hexane/toluene=1/1.

TABLE 8

| (Adhesive D) | |
|---|---|
| CR | 100 parts |
| IIR | 150 parts |
| Phenolic resin | 60 parts |
| Organic solvent | 930 parts |

The phenol resin in Adhesive D is a novolak-type phenol resin "Tamanol-520S" manufactured by Arakawa Chemical Industry Co., Ltd. Further—the organic solvent is a solvent mixture of n-hexane/ethyl acetate/toluene=1/1/1.

Next, in order to confirm the effect achieved by the use of primer 2 and adhesive 3 in the structure for mounting molding described above, molding 1 was mounted in body 7 in the manner described above, which was then allowed to stand at room temperature for 3 days, whereupon the shearing strength was measured under the condition of a tensile rate of 30 mm/min.

The combinations of adhesive 3 and primer 2 used in this test and each shearing strength are shown in Table 9.

TABLE 9

| Test | Adhesive | Primer | Shearing Strength* |
|---|---|---|---|
| 1 | B | A | 13.2 |
| 2 | B | B | 18.5 |
| 3 | B | C | 17.8 |
| 4 | A | B | 16.5 |
| 5 | C | B | 17.7 |
| 6 | D | B | 5.3 |
| 7 | Comparative Example 1 | | 1.5 |
| 8 | Comparative Example 2 | | 1.7 |

*(unit: kg/cm$^2$)

Comparative Example 1 shown in Table 9 indicates the case where a commercially available chloroprene rubber adhesive (Cemedine-210, made by Cemedine Co., Ltd.) was coated on both surfaces of tape 4 and Comparative Example 2 indicates the case using a commercially available double-coated tape "563" (made by Nitto Denko Industry) having coated an acrylic adhesive on both surfaces thereof.

In the case of using Adhesive D, the formulation ratio of IIR was excessive so that the strength decreased as compared to the cases using Adhesives A to C.

As described above, the adhesion between molding 1 and tape 4 can be markedly improved as compared to the cases of the related art, in accordance with the present invention.

Accordingly, peeling of molding 1 apart from body 7 can be prevented over a long period of time by the use of adhesive 3 described above in combination with primer 2. In addition, the present invention has made possible marked reduction of production costs because no expensive double-coated tape is used in the present invention, as is required in the related art described above.

Further, the structure for mounting the molding using the adhesive and the primer described above is an extremely useful invention which can be embodied not only for mounting the molding in a body of an automobile but also as a structure for mounting various synthetic resins to metals or other members.

It will be apparent to one skilled in the art that various changes and modifications can be made over a wide range by different embodiments without departing from the spirit and scope of the present invention and therefore, the present invention is not deemed to be limited to the specific embodiments other than limited to the appended claims.

What is claimed is:

1. A molding-bearing substrate, comprising:
    (a) a substrate having a surface adapted to have a molding adhered thereto;
    (b) a molding adapted to be adhered to said surface of said substrate;
    (c) a strip of tape having a first face and, opposed to said first face, a second face;
    (d) a first adhesive means interposed between said first face of said strip of tape and said surface of said substrate and adhering said strip of tape to said surface of said substrate; and
    (e) a second adhesive means interposed between said second face of said strip of tape and said molding and adhering said molding to said strip of tape, said second adhesive means comprising:

(i) a layer of primer coated on said molding, and
(ii) a layer of adhesive coated on said layer of primer, so that said layer of adhesive adheres to said second face of said tape, and said layer of primer adheres both to said layer of adhesive and to said molding;

said layer of primer comprising a mixture of 10–500 parts by weight of at least one polymer selected from the group consisting of a polyacrylic acid derivative and a polymethacrylic acid derivative, and 100 parts by weight of chloroprene rubber, and said layer of adhesive comprising a mixture of 5–100 parts by weight of isobutylene-isoprene rubber, 1–50 parts by weight of a phenolic resin, and 100 parts by weight of chloroprene rubber.

2. The molding-bearing substrate of claim 1, wherein:

said substrate is steel plate having an acrylic baking finish providing said surface thereof;

said molding is made of a synthetic resin selected from the group consisting of polyvinylchloride, polyurethane, ethylene-vinyl acetate copolymer and vulcanized polyolefin rubber;

said strip of tape is made of a material selected from the group consisting of foamed acrylic rubber, foamed polyethylene, non-woven cloth, kraft paper and synthetic resin film;

said first adhesive means is made of acrylic adhesive; and said phenolic resin of said layer of adhesive is a novolak-type phenolic resin.

* * * * *